Sept. 5, 1933.  W. CHISM  1,925,686
THERMOSTATIC CONTROL DEVICE
Filed Jan. 11, 1932
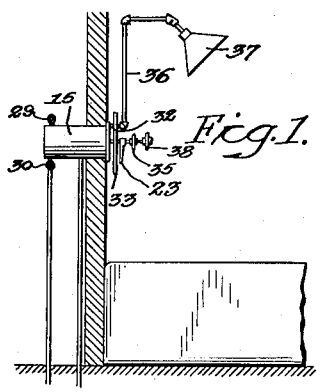
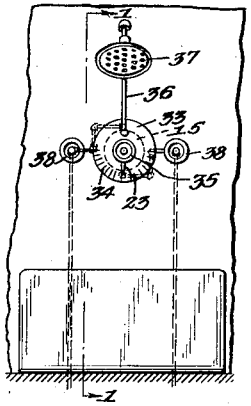
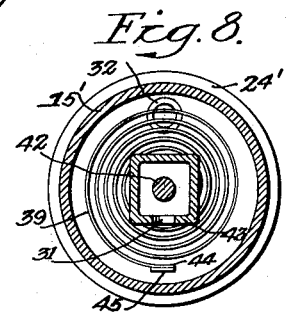
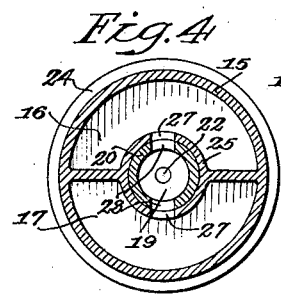
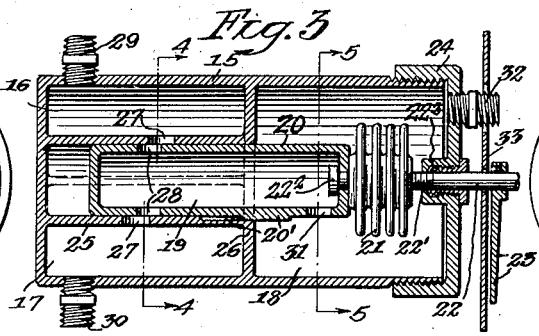
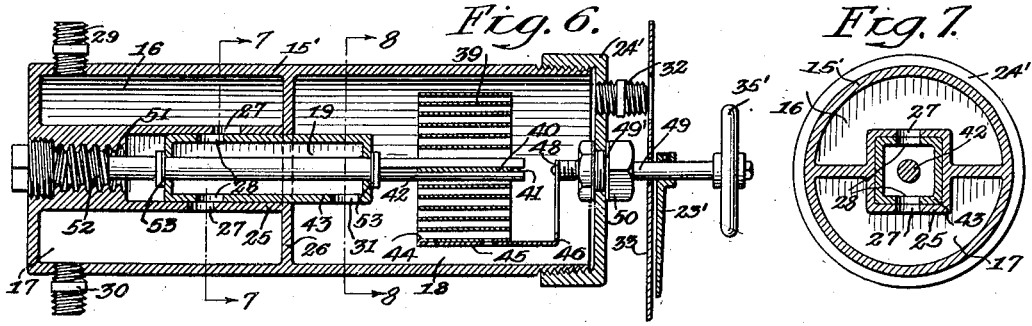
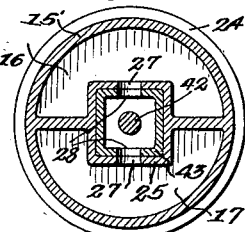
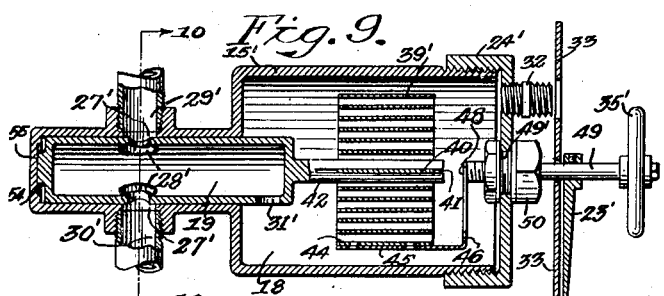
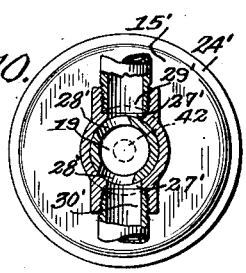
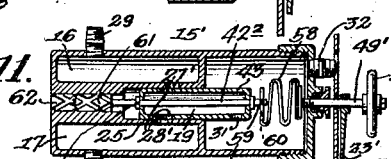
Inventor
Walter Chism Patented Sept. 5, 1933

1,925,686

UNITED STATES PATENT OFFICE 1,925,686

THERMOSTATIC CONTROL DEVICE

Walter Chism, Collingswood, N. J., assignor to Robert Hetherington, Sharon Hill, Pa.

Application January 11, 1932. Serial No. 585,865

6 Claims. (Cl. 236—12)

My invention relates to show baths, with more particular reference to the regulation of water flow into shower heads. While intended for use in any application to which it may be adapted, by invention is believed to have perhaps its best use in connection with shower heads for limiting the shower temperature, as for example, in structure including a thermostatic element opening and closing the water supply to a longitudinally or rotatably movable mixing chamber from which the water is discharged to the shower head at a temperature that is not too high.

The main purpose of my invention is to provide a novel and effective adjustable temperature control device for shower bath structure in which adjustment can be obtained by varying the position of a water mixing chamber without detaching the device from its location in the pipe line of a shower bath, and from outside the control device.

A further purpose is to construct a control device comprising a cold water inlet compartment, a hot water inlet compartment, a longitudinally movable hollow valve member operated by the thermostat enclosed in a chamber in a compartment adjacent the hot and cold water inlet compartments, the hollow valve sleeve having lateral ports that communicate respectively with ports in the hot and cold water chambers and into the thermostatic chamber.

A further purpose is to move a hollow mixing chamber longitudinally by means of a bellows-like thermostat having a forwardly projecting shaft and a pointer upon the shaft adapted to register with indications upon a dial adjacent the pointer and surrounding the shaft.

A further purpose is to advance or return the movement of a mixing chamber attached to a thermostatic coil spring by threading a portion of the stem into a bore, the walls of which are rigid with the body of a control device.

A further purpose is to provide a valve assembly with a reciprocating stem adapted to carry a hollow valve and to move the hollow valve into and out of port registry with hot and cold water inlets to allow water from either the hot or cold water inlet to pass through the hollow valve and into another chamber into contact with a thermostatic element in the last mentioned chamber.

A further purpose is to employ a movable mixing chamber whose position is determined by a thermostat, and to use openings in the chamber walls as hot and cold water valve ports, while mixing the hot and cold water admitted to the chamber within the chamber itself.

A further purpose is to supply rotary movement to a mixing chamber to cause it to communicate to varying extents with either a hot water chamber or a cold water chamber or with both the hot and cold water chambers.

A further purpose is to supply rotary movement to a hollow valve member by movement of a thermostatic element.

A further purpose is to provide reciprocating movement to a hollow valve member by means of a thermostatic element.

A further purpose is to impart rotary movement to a hollow spindle of a control device by means of a coiled thermostatic element to cause opening and closing of lateral ports into hot and cold water compartments and thereby pass the water through the hollow spindle into contact with the thermostat to move the spindle when the temperature of the water varies.

A further purpose is to construct a control device for shower bath structure in which two inlet chambers cooperate with a movable mixing chamber, which mixing chamber discharges into a thermostatic chamber, the temperature of the water discharged into the thermostatic chamber controlling the registry of a valve with the inlet chambers.

Further purposes will appear in the specification and in the claims.

I have preferred to illustrate a few only of the many different forms my invention may assume, selecting forms that are practical, efficient in operation and which well illustrate the principles involved.

Describing in illustration but not in limitation and referring to the drawing:

Figure 1 is a sectional elevation of a shower bath with my control device in place behind an adjacent wall, the section being taken on the line 1—1 of Figure 2.

Figure 2 is a front elevation of Figure 1, illustrating a desirable form of installation.

Figure 3 is a longitudinal section of a preferred form of my control valve.

Figure 4 is a transverse section taken on the line 4—4 of Figure 3.

Figure 5 is a transverse section taken on the line 5—5 of Figure 3.

Figure 6 is a longitudinal sectional elevation somewhat similar to Figure 3, but showing a different form of thermostatic element.

Figure 7 is a transverse section taken on the line 7—7 of Figure 6.

Figure 8 is a transverse section taken on the line 8—8 of Figure 6.

Figure 9 is a longitudinal section similar to Figures 3 and 6, but showing another modification in which a hollow valve is adapted to rotary movement by a coiled thermostatic element.

Figure 10 is a transverse section taken on the line 10—10 of Figure 9.

Figure 11 is a view similar to Figure 9 but showing a different form of thermostatic element. The scale is smaller than that of Figure 9.

The present application is a development of the subject matter of Robert Hetherington application, Serial No. 578,955, filed Dec. 4, 1931, for Thermostatic control device, and is the property of the said Robert Hetherington.

I prefer to place my control device behind the wall of a bathroom, but it will be clearly understood that this is a matter of choice only, and that it may be applied at any convenient location to meet the requirement of the user. I have therefore illustrated it in the drawing as being placed behind a wall with its supply piping connections behind the wall and its outlet to the shower head within the bath room and above a bath tub.

Many convenient arrangements of control may be used, but I preferred to illustrate one form only, which is shown in Figures 1 and 2.

In general, I plan to mix together hot and cold water coming from hot and cold water supply lines, to conduct the mixed water into contact with a temperature-sensitive device, and thereby, to control the relative quantities of hot and cold water which go into the mixture. I may apply my invention to a number of somewhat variant uses, such as, to maintain a constant range of temperature of mixed water passing to the shower bath, irrespective of the temperature of the hot and cold water, or to set maximum and minimum temperatures, either or both, for the mixed water. In Figures 3, 4, and 5 I have illustrated a control device 15 having a longitudinally movable mixing chamber.

I have provided a hot water inlet compartment 16, a cold water inlet compartment 17, and a thermostatic compartment 18 in the control device proper, with a longitudinally movable mixing compartment 19, formed in a hollow longitudinally movable sleeve 20, secured to a bellows-like thermostatic element 21, the element being fastened to a spindle 22, packed at $22^3$, on which a pointer 23 is fastened at the cap end 24 of the control unit. Near the opposite end of the hollow sleeve, I provide a guiding rear casing 25, integral with the main housing of the control device 15, the casing having walls 26 which form ends of the compartments 16 and 17. I place apertures 27 in the casing that cooperate with apertures 28 in the hollow sleeve 20.

The valve 20 is prevented from rotation by a slot and key guiding connection at 20′.

Hot water is supplied to the hot water chamber 16 through an inlet pipe 29 and cold water is supplied to the cold water chamber 17 through an inlet pipe 30. The water from both chambers will pass through the apertures into the hollow sleeve, which in the present instance is the mixing chamber, and then outwardly through a port 31 in the hollow sleeve into the thermostat chamber, from whence it will pass through an outlet 32 to the shower.

The thermostat in this illustration is of the progressively expanding type.

Bellows-type or sylphon thermostat elements are commonly of two kinds. In the one form, the thermostatic shell is filled with an expansible liquid or vapor which acts progressively to lengthen the thermostat as the temperature increases and to shorten the thermostat as the temperature decreases.

In the other form, while a gas or vapor is placed in the thermostat, the thermostatic chamber is evacuated, so that the thermostat must overcome atmospheric pressure before it can expand. The latter type, therefore, will remain substantially constant in length up to a critical temperature at which the internal pressure exceeds the external pressure of the atmosphere, and subsequently will expand with a snap during a relatively short temperature range, as determined by the physical constants of the internal gas or liquid.

If the water should become too hot the thermostat will expand and cause the hollow sleeve to move longitudinally to close the hot water inlet to the sleeve by relative movement of the ports, at the same time opening the cold water inlet. On the other hand, if the water should become too cold the constriction of the bellows will cause the hollow sleeve to move in the opposite direction, closing the cold water inlet to the sleeve and opening the hot water inlet. The cold and hot water inlets to the mixing chamber are preferably arranged so that the hot water inlet is fully closed when the cold water inlet is fully open and vice versa.

A very excessive temperature will cause all inlets to the mixing chamber to close, thus preventing burning of the user by having hot water pushed through the shower head by cold water behind it.

A dial 33 having graduations 34 is secured to the wall structure at the front end of the control valve and registers with the pointer 23 fixed to the spindle 22. It will be obvious that by turning a handle 35 the pointer 23 can be set at any desired temperature as indicated by the graduations 34 on the dial 33. The setting can, of course, be accomplished by trial and error without using the dial.

By setting the pointer at a designated point on the dial, thereby turning the spindle 22 and the threads 22′ thereon, the thermostatic element and the hollow sleeve attached to it can be moved longitudinally to cause a change of registry between the ports 27 and 28 respectively in the stationary sleeve 25 and the hollow movable sleeve 20. When the spindle 22 is moved in or out by the threads, the thermostatic element turns and also moves longitudinally, while the movable sleeve 20 moves only longitudinally, without rotating, because of the swivel joint at $22^2$. The user can be assured by this change of registry of the ports that the temperature of the water passing the thermostat chamber 18 will lie within a range determined by the pointer.

Cold water enters through an inlet into the cold water chamber and hot water enters through an inlet into the hot water chamber. As the water passes from either of the chambers through the ports into the movable mixing chamber and from the mixing chamber into the thermostat chamber, the temperature of the water will have its expanding or contracting effect upon the thermostatic element, which will cause the hollow sleeve to move in one direction if the water is too hot, or in the opposite direction if the water is too cold. If the water in the thermostatic chamber be markedly too hot or markedly too cold, the hollow valve will close either the port communicating with the hot water chamber or the port communicating with the cold water chamber. If the water be of a desirable temperature, that is, not too hot or not too cold, according to the thermostatic setting, the valve will remain neutral as seen in Figure 3 and both hot and cold water will be allowed to pass into and through the hollow valve or mixing chamber and thence to the thermostat chamber from which the mixed water will be supplied to the shower head through the outlet in the cap end of the control device.

If, when the mixing chamber is in a position such as that shown in Figure 3, the hot water temperature increase, as due to some change in the demand for hot water elsewhere in the system, the temperature of the mixed water will momentarily increase, and then the thermostat will expand, moving to the left in Figure 3, closing the hot water valve opening and increasing the cold water valve opening. Increase in cold water temperature will have the same effect, while decrease in either hot or cold water temperature will cause the thermostat to contract and will move the valve in the opposite direction.

The hollow interior of the valve 20 is very desirable as a mixing chamber, as hot and cold water from the hot and cold water inlet ports must flow longitudinally of the chamber in parallel gradually-blending streams, and then submit to jet action through the port 31. No extra room is required for the mixing chamber, yet there is relatively little danger that the water may fail to be properly mixed before touching the thermostatic element. By having the hot and cold water ports opposite, the streams entering the mixing chamber initially strike head on, and additional mixing is obtained in this way.

In Figures 1 and 2, I show a pipe 36, from the outlet 32 of the thermostatic chamber, connected to a shower nozzle 37 placed above a bath tub. In this structure, the control valve is mounted between the valve faucet handles 38, but below the shower nozzle and within easy reach of the user.

In Figures 6, 7, and 8, I have illustrated a device somewhat similar to that of Figures 3, 4, and 5, excepting that the thermostat in the form of Figures 6, 7 and 8 is a coiled spring. The coiled spring 39 is fastened at its inner end 40 in a slot 41 in a spindle 42 of a hollow sleeve 43. At its outer end 44 the thermostat 39 is secured to an extension 45 of an L-shaped bracket 46. The inner end 48 of the bracket 46 is attached to a spindle 49 in a fitting 50 supported in a cap 24' at the front end of the main housing of the control unit 15'. The spindle carries an adjusting handle 35' and is packed at 49'.

As in Figures 3 to 5, a dial 33 having graduations 34 is secured to the wall structure at the front end of the control valve and registers with a pointer 23' fixed to the spindle 49.

Longitudinal movement of the hollow sleeve 43 is obtained due to expansion or contraction of the coiled thermostatic element 39 operating about the valve spindle 42.

Threads 51 are formed in the outer end of the control unit housing, and cooperate with threads 52 on the valve spindle 42. The valve spindle 42 is inserted through openings at the ends of the hollow sleeve 43 and packing rings 53 are put in place at the ends of the hollow sleeve to limit leakage while permitting turning of the spindle 42 with respect to the hollow sleeve 43. It will be obvious that rotation of the thermostatic spring will revolve the spindle, and cause the valve sleeve to move longitudinally, due to the longitudinal movement of the spindle caused by the cooperating threads between the spindle and the housing. I have preferred to show a rectangular hollow sleeve in order to keep the sleeve from rotating, but it will be obvious that the cross section of the face of the sleeve is immaterial and a round sleeve could be employed with equal advantage by providing a keyed connection between the stationary sleeve and the movable sleeve as has been illustrated in the previously mentioned figures.

The operation of the control unit of Figures 6, 7, and 8, is substantially the same as that of Figures 3 to 5. The thermostat will maintain any desired range of temperature and the discharge temperature may be varied by moving the handle 35'. If the temperature of the mixed water tends to rise due to increase in temperature of the incoming water, the thermostat will expand and compensate for the temperature change, and if the temperature of the mixed water tends to fall due to decrease in temperature of the incoming water, the thermostat will contract and make a correction for the change in temperature. In the forms of Figures 3 to 5 and 6 to 8 the valve sleeve is caused to move longitudinally, but in Figures 9 and 10 I have shown a device in which the hollow valve is rotated. As in Figure 6 I place a coiled spring thermostat 39' in the thermostatic chamber and secure the inner end of the spring in a slot 41 in the valve spindle 42, the outer ends of the thermostat spring being secured to an L-shaped bracket 46 as described previously.

Water is supplied to the thermostatic chamber through the cooperating ports 27', 28' and the port 31' from a hot water inlet 29' and a cold water inlet 30' into the hollow valve and is discharged through an opening 31' at the forward end of the hollow valve into the thermostatic chamber 18. If the water should become too hot, the thermostatic element 39' will expand, rotating the valve counterclockwise, in the position of Figure 10, decreasing the size of the hot water opening to the mixing chamber and increasing the size of the cold water opening, so that the water in the mixing chamber will become cooler although the temperature finally reached will not be as low as the initial temperature of the mixed water. In case the water becomes too cold, the thermostatic element 39' will contract, turning the sleeve clockwise in the position of Figure 10, increasing the size of the hot water opening to the mixing chamber and decreasing the size of the cold water opening, so that the water in the mixing chamber will get hotter, although it will not rise quite to the temperature indicated by the pointer. In case a surge of excessively hot water reaches the thermostat, the valve will shut off the hot water entirely, protecting the user from possible scalding.

The ports 27' and 28' are relatively large, so that a considerable range of setting of the valve by turning the handle 35' is permitted. If desired, the water may be entirely shut off by rotating the valve until the ports are all closed. Such a shut-off position may be indicated on the dial 33, with adjustment positions circumferentially spaced from the shut-off position.

The rear end of the casing of the unit 15' is recessed at 54 to provide a bearing surface for the outer end 55 of the valve spindle 42.

In the form of Figures 9 and 10, I have omitted the hot and cold water inlet chambers 16 and 17, applying the hot and cold water inlets 29' and 30' directly to the valve ports. While this form is cheap to make and convenient in use, and may of course be applied in any control unit of my invention, I do not prefer it as it does not permit storage of hot and cold water near the inlets for the purpose of pressure and temperature uniformity.

In Figure 11 I show a modification of the forms of Figure 3. In this form, the thermostatic element 58 is of the flat spring type, bent in SS formation. The outer end of the thermostatic element is provided with a yoke at 59 engaging in a slot 60 in the spindle 42² making a pivotal connection with the spindle 42². The inner end of the thermostatic element 58 is secured to a spindle 49' which makes threaded engagement with the cap end 24' of the control device. The spindle 49', as previously described in Figures 3, 6 and 9, is provided with an operating handle 35' by which the pointer 23' is caused to register with the graduations 34 on the dial 33 adjacent the front end of the control device.

The opposite end of the spindle 42² is provided with a threaded extension 61 that makes a threaded engagement with a bore 62 at the outer end of the control unit 15'. The spindle 42² makes rotatable engagement with the valve 43 by means of the rings 53, as shown in Figure 6, and the valve 43 is preferably square and moves in a square sleeve, as shown in Figure 7.

In all other respects the construction of this form is the same as that shown in the previously mentioned figures, and I have given the corresponding parts the same reference characters.

The operation of Figure 11 is the same as that of Figures 6 and 9. The threads at 61 and 62 assist in guiding the spindle 42². It will be obvious that the form of Figure 11 is quite simple in construction and will provide progressive longitudinal movement, as will the bellows-type thermostat of Figure 3, or the coiled thermostat of Figures 6 and 9.

In the operation of Figure 11, hot and cold water is discharged into the thermostatic chamber from the mixing chamber and, in the event that the water becomes too hot, the thermostatic element expands and causes the hollow valve to move outwardly from its connection with the cap end of the control device, and by so doing causes the spindle 42² to move outwardly. At the same time the forward movement of the spindle 42² moves the valve forward (at the same time rotating the spindle 42², although this is immaterial except to guide the spindle in the threads) thereby changing the opening of the ports between the movable mixing chamber and the hot and cold water inlet chambers.

It will be evident that I provide a valve in which initial adjusting of the relative quantities of hot and cold water passing through the valve may be made, and then a range of temperature including the initial setting is thermostatically maintained. Obviously, this principle may be applied to a wide variety of valves, and accordingly several valve constructions have been illustrated, without thought, however, that they exhaust the subject matter. The intention is merely to suggest that the invention is applicable to a wide variety of shower bath control valves, whether they operate progressively or merely to prevent an excessive change in temperature.

It will be evident that, by moving my hot and cold water mixing chamber, making it the effective valve, I get a very desirable degree of mixing, along with a compactness and strength which are very desirable.

It will further be evident that my mixing unit may be located, if desired in the shower head itself, or as an adjunct to it, or may be put at some other position in the supply piping from the one shown. In case the control unit is directly associated with the shower head, the adjustment handle may be made accessible through the spray nozzle or otherwise.

In view of my invention and disclosure, variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent:

1. In a shower bath mixing unit, a casing, walls forming a hot water chamber, a cold water chamber and a thermostatic chamber, a centrally located hollow valve fitting a central bore between the hot and cold water chambers, the hot water chamber and the cold water chamber communicating with the interior of the hollow valve to cause mixing of the hot and cold water in the hollow valve, the hollow valve in turn communicating with the thermostatic chamber and the valve controlling the relative quantities of hot and cold water flowing from the hot and cold water chambers into the hollow valve, manually operated means for varying the setting of the valve, a thermostat in the thermostatic chamber and wholly outside the movable valve in heat transfer relation with the mixed water within the thermostatic chamber and connections from the thermostat to the hollow valve for changing the position of the valve for a given manual valve setting, as the temperature of the mixed water varies.

2. In a shower bath mixing unit, an elongated movable valve having near one end lateral ports which cooperate with hot and cold water inlet ports to admit variant quantities of hot and cold water for mixing in the valve interior and having near the other end a lateral throttle port communicating with a thermostat compartment wholly outside the hollow valve and having a discharge to the shower, a thermostatic element wholly outside the valve and in the said compartment, and operative connections between the element and valve adapting the element to control the position of the valve.

3. In a shower bath mixing unit, an elongated hollow movable valve having near one end two lateral inlet ports and having near the other end a throttled outlet port, walls forming stationary ports cooperating with the inlet ports, the clear opening from one set of ports decreasing and the clear opening of the other set of ports increasing when the valve is moved in one direction, hot and cold water connections to the stationary ports, stationary walls forming a compartment wholly outside of and casing the said other end of the movable valve and communicating with the valve interior through the said throttled outlet port, a thermostatic element in the compartment and wholly beyond the valve and operating connections adapting the element to control the position of the valve.

4. In a shower bath mixing unit, an elongated hollow longitudinally movable valve having near one end two lateral inlet ports and having near the other end a throttled outlet port, walls forming stationary ports cooperating with the inlet ports, the clear opening from one set of ports decreasing and the clear opening of the other set of ports increasing when the valve is moved in one direction, hot and cold water connections to the stationary ports, stationary walls forming a compartment wholly outside of and casing the said other end of the movable valve and communicating with the valve interior through the said throttled outlet port, a thermostatic element in the compartment and wholly beyond the valve and operating connections adapting the element to control the position of the valve.

5. In a shower bath mixing unit, an elongated cylindrical hollow movable valve having near one end, two lateral inlet ports and having near the other end a throttle outlet port, walls forming stationary ports cooperating with the inlet ports, the clear opening through one set of ports increasing and the clear opening through the other set of ports simultaneously decreasing when the valve is angularly moved in one direction, hot and cold water connections to the stationary ports, other walls forming a compartment wholly outside the movable valve, communicating with the movable valve and discharging to the shower, a thermostatic element wholly outside the valve in the said compartment and operative connections between the thermostatic element and valve adapting the element to control the angular position of the valve.

6. In a shower bath mixing unit, an elongated cylindrical hollow angularly movable valve within the casing, said valve having two variable openings near one end and a throttle discharge opening near the other end, one of the variable openings being made larger and the other smaller by angular movement of the valve in one direction, hot and cold water connections to the variable openings, a thermostat wholly outside the valve at the said other end thereof adapted to move the valve angularly, walls forming a thermostat compartment, said compartment communicating with the valve interior through the throttle discharge opening thereof and discharging to the shower and an adjustable support for the radially outside end of the thermostat accessible from outside the compartment.

WALTER CHISM.